Patented Mar. 21, 1933

1,902,364

UNITED STATES PATENT OFFICE

VALENTIN HILCKEN, OF GERSTHOFEN, NEAR AUGSBURG, GERMANY, ASSIGNOR TO I. G. FARBENINDUSTRIE AKTIENGESELLSCHAFT, OF FRANKFORT-ON-THE-MAIN, GERMANY

METHOD OF PREPARING FATTY ACID ESTERS OF BORNEOL AND ISOBORNEOL

No Drawing. Application filed October 19, 1931, Serial No. 569,843, and in Germany November 7, 1930.

My present invention relates to an improved method of preparing fatty acid esters of borneol and isoborneol, more particularly to a method of preparing the acetic acid ester and formic acid ester.

Fatty acid esters of borneol and isoborneol have hitherto been prepared by causing the corresponding fatty acids to react upon camphene in the presence of a catalyst, for instance sulfuric acid, phosphoric acid, zinc chloride and the like. This process requires the use of an excess of fatty acid of, for instance, about 470 per cent. and the application of an elevated temperature because, otherwise, the yield is rather low. Thereby the disadvantage is involved that after the esterification process is completed, the excess of the fatty acid has to be removed by distillation or a washing operation. The esterification with formic acid may likewise be performed without the use of a catalyst; however, in this case an excess of 500 per cent. of acid is necessary. If the esterification is performed with an excess of about 26 per cent. of formic acid, there must be applied during the esterification a temperature which is higher than the boiling point of the acid.

I have now found that the esterification of camphene with fatty acids can be considerably improved by using boron trifluoride as a catalyst. In this case the reaction already takes place with a small excess of 20 per cent. of fatty acid over the theoretical amount and at ordinary temperature. This effect is produced by the application of a small amount of boron trifluoride. An amount of about 0.3 to 1 per cent., calculated upon the amount of the camphene, is, for instance, suitable. The heat evolved during the reaction can be removed by a cooling operation. It is likewise possible to use camphene and fatty acid in molecular quantities; however, in this case, the application of an elevated temperature of, for instance, about 50° C. and a prolonged time are necessary.

By my new process the advantage is involved that the use of a great excess of the fatty acid and the distilling and washing out of the excess of fatty acid after the reaction is complete have become unnecessary.

The new process may be applied in the preparation of all fatty acid esters of borneol and isoborneol, particularly of those of the lower acids, such as formic acid, acetic acid, propionic acid etc.

The following examples serve to illustrate the invention, but they are not intended to limit it thereto:

(1) 100 grams of camphene of 96 per cent. strength, 53 grams of glacial acetic acid of 100 per cent. strength and 1 gram of boron trifluoride dissolved in a small quantity of glacial acetic acid are mixed, while stirring. The liquid at first turbid, very quickly becomes clear and heats itself to about 50° C. The solution is allowed to stand for some time at room temperature. After the solution has been washed with water, 95.1 per cent. of isobornyl acetate are obtained, corresponding to an esterification of 99 per cent.

(2) 100 grams of camphene of 96 per cent. strength, 250 grams of glacial acetic acid of 100 per cent. strength and 1 gram of boron trifluoride are mixed, while agitating. The solution heats itself slightly. It is allowed to stand at ordinary temperature. After the solution has been washed with water, isobornyl acetate of 96 per cent. strength is obtained.

(3) 100 grams of camphene of 97 per cent. strength, 41.5 grams of formic acid of 99 per cent. strength and 0.4 gram of borontrifluoride are mixed, while agitating and the mixture is kept at a temperature of 50° C. The mixture at first turbid, very quickly becomes clear. The yield of ester obtained is: after 2 hours, 92.9 per cent. of ester at 50° C.; after further 4½ hours, 94.6 per cent. of ester at 50°C.; after further 14½ hours, 97.0 per cent of ester at room temperature; corresponding to an esterification of 100 per cent.

(4) If the process is carried out as described in Example 3, but without heating the mixture, at ordinary temperature, the following yields of ester are obtained: after 1 hour, 76.6 per cent. of ester; after a further hour, 84.6 per cent. of ester; after further 4½ hours, 92.3 per cent. of ester; after further 14½ hours, 95.3 per cent. of ester; corresponding to an esterification of 97.3 per cent.

In the following claims the term "borneol" is intended to include likewise "isoborneol" which is an obvious chemical equivalent thereof.

I claim:

1. In the process of preparing fatty acid esters of borneol by causing fatty acids to react upon camphene, the new step which consists in adding a small amount of borontrifluoride to the reaction mixture.

2. In the process of preparing fatty acid esters of borneol by causing fatty acids to react upon camphene, the new step which consists in adding a small amount of borontrifluoride of about 0.3 to 1 per cent, calculated upon the amount of camphene, to the reaction mixture.

3. The new process which comprises reacting at ordinary temperature with fatty acids upon camphene in the presence of a small amount of borontrifluoride.

4. The new process which comprises reacting at ordinary temperature with fatty acids upon camphene in the presence of a small amount of borontrifluoride of about 0.3 to 1 per cent., calculated upon the amount of camphene.

5. The new process which comprises reacting at ordinary temperature with lower fatty acids upon camphene in the presence of a small amount of borontrifluoride.

6. The new process which comprises reacting at ordinary temperature with lower fatty acids upon camphene in the presence of a small amount of borontrifluoride of about 0.3 to 1 per cent., calculated upon the amount of camphene.

7. The new process which comprises causing lower fatty acids in a small excess to act upon camphene in the presence of a small amount of borontrifluoride.

8. The new process which comprises reacting with lower fatty acids in an excess of about 20 per cent. over the theoretical amount upon camphene in the presence of a small amount of borontrifluoride.

9. The new process which comprises reacting with the theoretical amount of a lower fatty acid upon camphene in the presence of a small amount of borontrifluoride at a slightly raised temperature of about 50° C.

10. The new process which comprises acting at an ordinary temperature with acetic acid in an excess of about 20 per cent. over the theoretical amount upon camphene in the presence of about 1 per cent. of borontrifluoride, calculated upon the amount of camphene.

11. The new process which comprises acting at a temperature of about 50° C. with formic acid in an excess of about 20 per cent. over the theoretical amount upon camphene in the presence of about 0.4 per cent. of borontrifluoride, calculated upon the amount of camphene.

In testimony whereof, I affix my signature.

VALENTIN HILCKEN.